(12) United States Patent
Ichikawa (10) Patent No.: US 7,581,784 B2
(45) Date of Patent: Sep. 1, 2009

(54) FRONT STRUCTURE FOR VEHICLE

(75) Inventor: Manabu Ichikawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 388 days.

(21) Appl. No.: 11/593,083

(22) Filed: Nov. 6, 2006

(65) Prior Publication Data

US 2007/0114814 A1 May 24, 2007

(30) Foreign Application Priority Data

Nov. 18, 2005 (JP) ............... P.2005-334432

(51) Int. Cl.
B62J 6/02 (2006.01)
(52) U.S. Cl. .............. 296/193.09; 296/193.1; 296/205; 296/203.02; 180/68.6
(58) Field of Classification Search ............. 296/181.4, 296/193.09, 193.1, 198, 205, 203.02; 180/68.4, 180/68.6
See application file for complete search history.

(56) References Cited

U.S. PATENT DOCUMENTS

| | | | | |
|---|---|---|---|---|
| 6,523,634 B1 * | 2/2003 | Gagnon et al. | ............ | 180/291 |
| 6,622,806 B1 * | 9/2003 | Matsuura | ............ | 180/68.1 |
| 7,325,848 B2 * | 2/2008 | Joseph et al. | ............ | 293/115 |
| 7,350,854 B2 * | 4/2008 | Harper | ............ | 296/198 |
| 2002/0038737 A1 * | 4/2002 | Morishita et al. | ............ | 180/291 |
| 2004/0251066 A1 * | 12/2004 | White | ............ | 180/68.6 |
| 2006/0279109 A1 * | 12/2006 | Kotrla et al. | ............ | 296/203.02 |
| 2009/0001762 A1 * | 1/2009 | King et al. | ............ | 296/198 |

FOREIGN PATENT DOCUMENTS

JP 2005-104282 A 4/2005

* cited by examiner

Primary Examiner—Jason S Morrow
(74) Attorney, Agent, or Firm—Birch, Stewart, Kolasch & Birch, LLP (57) ABSTRACT

A front structure for a vehicle is provided with a vehicle body frame, a front cover covering a front portion of the vehicle body frame, a left-right pair of light units supported on the front cover, a carry pipe supported at the front end of the vehicle body frame, and a grille disposed on the front side of the carry pipe. The carry pipe is provided with a vertical-direction extension portion and a left-right direction extension portion. The grille covers the vertical-direction extension portion from the front side while exposing at least a part of the left-right direction extension portion. Each of the light units has a front extension wall portion overlapping with a flange portion of the grille.

5 Claims, 9 Drawing Sheets

FRONT STRUCTURE FOR VEHICLE

This application claims foreign priority from Japanese Patent Application No. 2005-334432, filed on Nov. 18, 2005, the entire contents of which are hereby incorporated by reference.

BACKGROUND OF THE INVENTION

1. Field of the Invention

The present invention relates to a front structure for a vehicle such as an all-terrain vehicle.

2. Related Art

As a conventional all-terrain vehicle, there has been known a vehicle front structure comprising light units, a carry pipe, a front grille and the like on the vehicle body front side (refer to, for example, JP-A-2005-104282). The front structure described in JP-A-2005-104282 has a configuration in which the vertical direction of a front surface of the carry pipe is covered with the front grille, and grip portions provided to extend sideways from the carry pipe are covered with a cover disposed to surround edge portions of the light units.

Meanwhile, according to the front structure described in JP-A-2005-104282, the carry pipe is covered with the cover, the appearance quality is enhanced. In addition, mud, water and the like due to mud splashes during running are received by the cover. In this case, there is a limitation to the arrangement in which the grip portions to be used in moving the vehicle are provided at lower positions in the vehicle body.

SUMMARY OF THE INVENTION

One or more embodiments of the present invention provide a front structure for a vehicle having a carry pipe excellent in appearance quality, capable of restraining the coming-in of mud, water or the like due to mud splashes during running, and capable of being gripped easily.

In accordance with one or more embodiments of the present invention, a front structure for a vehicle is provided with: a vehicle body frame; a front cover covering a front portion of the vehicle body frame; a left-right pair of light units supported on the front cover; a carry pipe supported on the front end of the vehicle body frame and having extension portions extending respectively in the vertical direction and the left-right direction; and a grille disposed on the front side of the carry pipe, the grille covers from the front side the vertical-direction extension portions of the carry pipe, while exposing at least a part of the left-right direction extension portions, and the light units each have an extension wall portion overlapping with the grille.

In the front structure, the grille covers from the front side the vertical-direction extension portions of the carry pipe, while exposing at least a part of the left-right direction extension portions, and the extension wall portions of the light units are disposed so as to overlap with the grille. Therefore, the front structure for a vehicle is good in appearance quality, and the gap between the grille and the vehicle body side can be eliminated, whereby it is made difficult for mud, water and he like splashed during running to enter to the vehicle body side. Further, since the left-right direction extension portions of the carry pipe are not covered by other members, the carry pipe can be gripped easily, promising an excellent operability.

Further, the front structure may further be provided with: a radiator disposed on the rear side of the grille; and a shroud extending in the front-rear direction on lateral sides of the radiator. Lap areas where the grille and the extension wall portions of the light units overlap may be located on the front side of the shroud.

When the front structure is provided with: the radiator disposed on the rear side of the grille; and the shroud extending in the front-rear direction on lateral sides of the radiator, and the lap areas where the grille and the extension wall portions of the light units overlap are located on the front side of the shroud, a duct is formed by the grille and the extension wall portions of the light units. As a result, the outside air is efficiently guided to the shroud, and air intake is achieved easily. Further, it is made difficult for mud, water and the like to enter to the vehicle body side during running.

Further, the grille may include a flange portion so formed as to surround the left-right direction extension portions of the carry pipe, and the flange portion may overlap with the extension wall portions of the light units.

When the grille has a flange portion so formed as to surround the left-right direction extension portions of the carry pipe, and the flange portion overlaps with the extension wall portions of the light units, the gap between the grille and the vehicle body side can be eliminated. Therefore, it is made difficult for mud, water and the like to enter to the vehicle body side, and appearance quality is enhanced.

Further, the extension wall portions of the light units may extend along the left-right direction extension portions of the carry pipe.

When the extension wall portions of the light units extend along the left-right direction extension portions of the carry pipe, the rear side of the left-right direction extension portions of the carry pipe can be covered. As a result, the mud, water and the like due to mud splashes are received by the extension wall portions and, hence, would not easily enter to the vehicle body side, and appearance quality can be enhanced.

Further, the carry pipe may include a plurality of left-right direction extension portions in the left-right direction, and tip end portions of at least one pair of left-right direction extension portions are connected to each other.

When the carry pipe has a plurality of left-right direction extension portions in the left-right direction, and tip end portions of at least one pair of left-right direction extension portions are connected to each other, easily grippable portions of the carry pipe can be gripped according to the situation, whereby operability is enhanced.

Other aspects and advantages of the invention will be apparent from the following description and the appended claims.

DETAILED DESCRIPTION OF THE EXEMPLARY EMBODIMENTS

Figure 1:
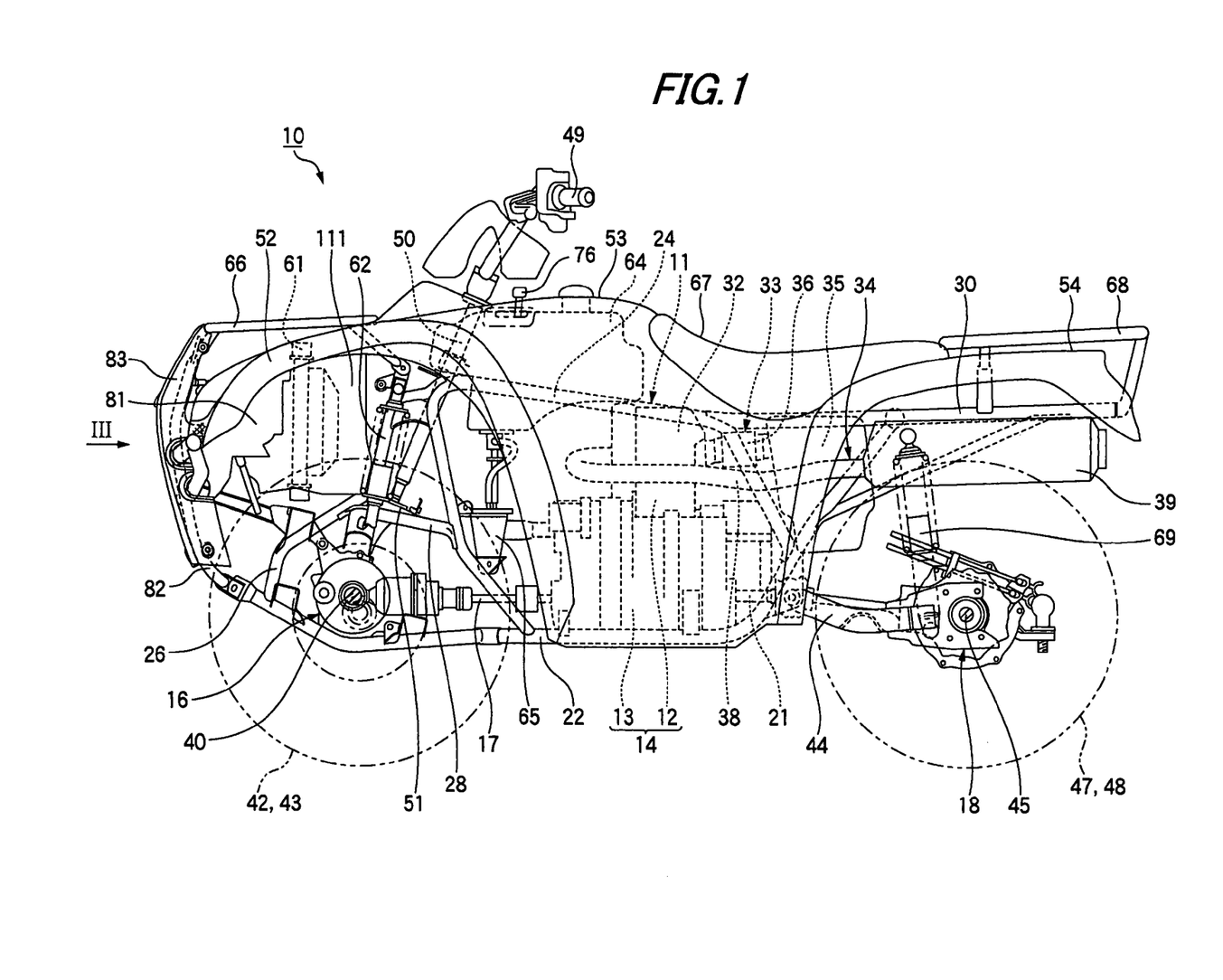
FIG. 1 is a side view of a vehicle configured by adopting a front structure for a vehicle according to an exemplary embodiment of the present invention.
Figure 2:
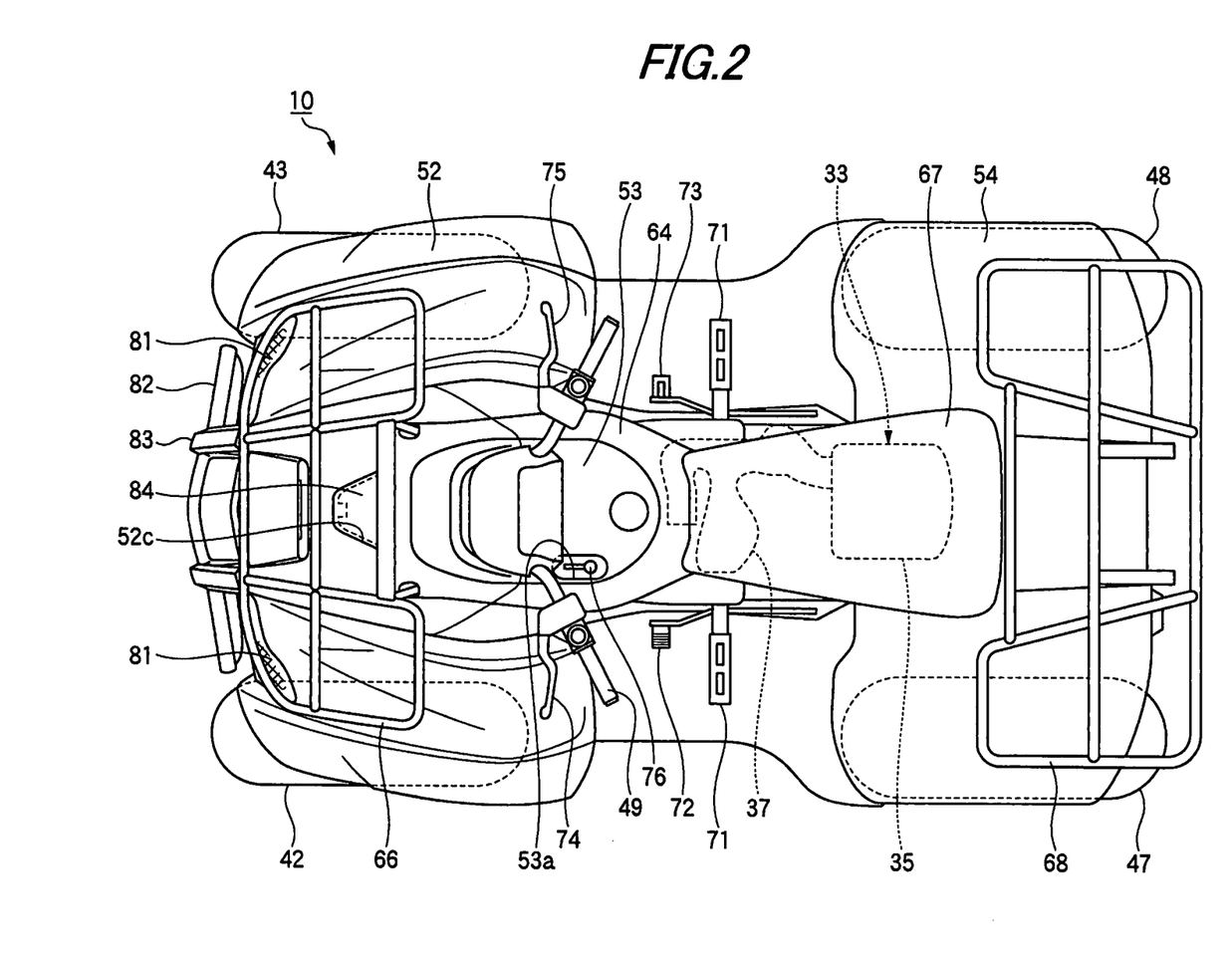
FIG. 2 is a plan view of the vehicle.

An exemplary embodiment of the invention will be described with reference to the accompanying drawings. Incidentally, the drawings are to be looked at according to the posture of symbols. FIG. 1 is a side view of a vehicle configured by adopting a front structure for a vehicle according to the exemplary embodiment of present invention, and FIG. 2 is a plan view of the vehicle.

First, the general structure of the vehicle 10 will be described, based on FIGS. 1 and 2. As shown in FIGS. 1 and 2, the vehicle 10 is a four-wheel-drive type all-terrain vehicle (ATV) in which a power unit 14 composed of a longitudinally disposed engine 12 and a transmission 13 is disposed substantially at the center of a vehicle body frame 11, a front final assembly 16 disposed on the front side of the power unit 14 and the transmission 13 are connected to each other through a front propeller shaft 17, and a rear final assembly 18 disposed on the rear side of the power unit 14 and the transmission 13 are connected to each other through a rear propeller shaft 21.

The vehicle body frame 11 includes: a left-right pair of lower frames 22, 23 (only the lower frame 22 on the viewer's side is shown) supporting a lower portion of the power unit 14; a roughly U-shaped left-right pair of upper frames 24, 25 (only the upper frame 24 on the viewer's side is shown) attached to upper portions of the lower frames 22, 23 so as to surround the power unit 14; a left-right pair of front frames 26, 27 (only the front frame 26 on the viewer's side is shown) connecting respectively front upper portions of the upper frames 24, 25 and front end portions of the lower frames 22, 23; a left-right pair of front connecting frames 28, 29 (only the front connecting frame 28 on the viewer's side is shown) connecting respectively the front frames 26, 27 and the upper frames 24, 25; and a left-right pair of rear upper frames 30, 31 (only the rear upper frame 30 on the viewer's side is shown) extended rearwards from rear upper portions of the upper frames 24, 25 and having intermediate portions connected to the rear ends of the lower frames 22, 23.

The engine 12 is provided with an intake system 33 and an exhaust system 34 which are connected to a cylinder portion 32. The intake system 33 comprises an air cleaner 35, a throttle body 36 and an intake duct 37 (see FIG. 2), while the exhaust system 34 is composed of an exhaust pipe 38 and a muffler 39.

The front final assembly 16 is a system connected to the side of left and right front wheels 42, 43 through a left-right pair of drive shafts 40, 41 (only the drive shaft 40 on the viewer's side is shown).

The rear final assembly 18 is an assembly which is swingably supported by a swing arm 44 and is connected to the side of left and right rear wheels 47, 48 through a left-right pair of drive shafts 45, 46 (only the drive shaft 45 on the viewer's side is shown).

A steering bar handle 49 for steering the front wheels 42, 43 is supported by a steering shaft 50. The steering shaft 50 has an upper portion rotatably mounted onto a cross pipe (not shown) bridgingly provided between front portions of the left and right upper frames 24, 25, and has a lower portion rotatably mounted onto a cross plate 51 bridgingly provided between the left and right front connecting frames 28, 29.

In addition, the vehicle body frame 11 is generally covered by: a front cover 52 covering a front portion of the vehicle body frame 11 and covering the upper and rear sides of the front wheels 42, 43; a body cover 53 covering an intermediate portion of the vehicle body frame 11 on the rear side of the front cover 52; and a rear cover 54 covering a rear portion of the vehicle body frame 11 and covering the front and upper sides of the rear wheels 47, 48.

Here, in FIG. 1, symbol 61 denotes a radiator, 62 and 63 denote a left-right pair of front cushion units (only the front cushion unit 62 on the viewer's side is shown), 64 denotes a fuel tank, 65 denotes a fuel pump, 66 denotes a front carrier, 67 denotes a seat, 68 denotes a rear carrier, and 69 denotes a rear cushion unit bridgingly provided between the side of the rear upper frames 30, 31 and the side of the rear final assembly 18. Besides, in FIG. 2, symbols 71, 71 denote driver's steps, 72 denotes a gear change pedal, 73 denotes a brake pedal, 74 denotes a clutch lever, and 75 denotes a brake lever.

Figures 9A, 9C:
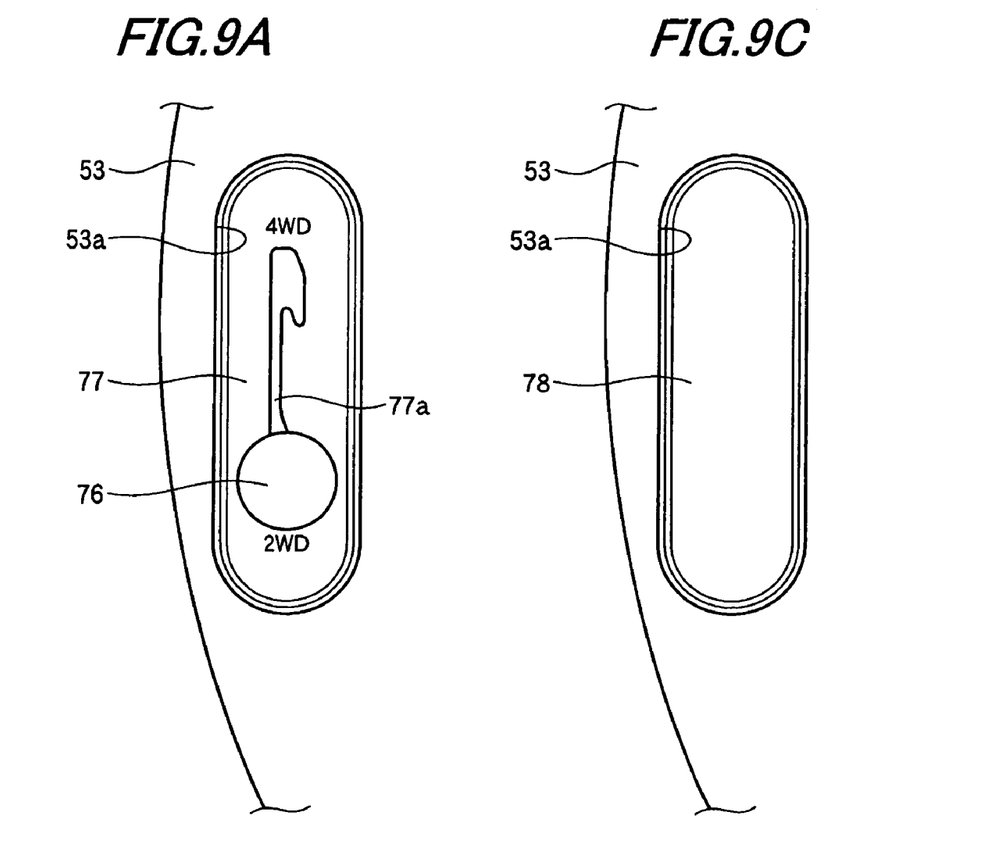
FIG. 9A is a front view of a lid member for a body cover in the case of a two-wheel-drive/four-wheel-drive changeover specification.
FIG. 9C is a front view of a lid member for a body cover in the case of a two-wheel-drive specification.
Figure 9B:
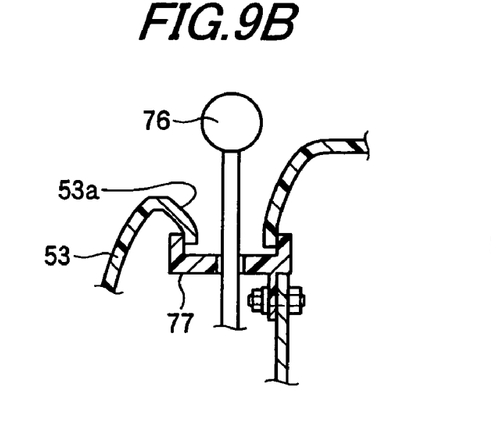
FIG. 9B is a sectional view of the lid member shown in FIG. 9A.
Figure 9D:
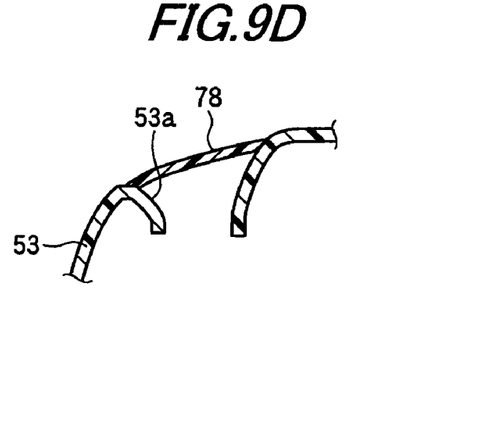
FIG. 9D is a sectional view of the lid member shown in FIG. 9C.

The body cover 53 is provided with an opening portion 53a on the left side of an upper surface thereof, and a drive system changeover lever 76 for manual changeover between the four-wheel-drive system and the two-wheel-drive system is disposed in the opening portion 53a. Incidentally, the vehicle 10 is supplied in two specification models, i.e., two-wheel-drive/ four-wheel-drive changeover specification and two-wheel-drive specification, and the body cover 53 can be used in common for both of the two specification models. In the case of the two-wheel-drive/four-wheel-drive changeover specification, a lid member 77 having a changeover groove 77a as shown in FIGS. 9A and 9B fronts on the opening portion 53a. In the case of the two-wheel-drive specification, a lid member 78 as shown in FIGS. 9C and 9D is attached to the opening portion 53a.

In addition, a left-right pair of light units 81 are supported on the front cover 52. A carry pipe 82 supported on the front end of the vehicle body frame 11 and a grille 83 disposed on the front side of the carry pipe 82 are provided on the front side of the front cover 52.

Figure 3:
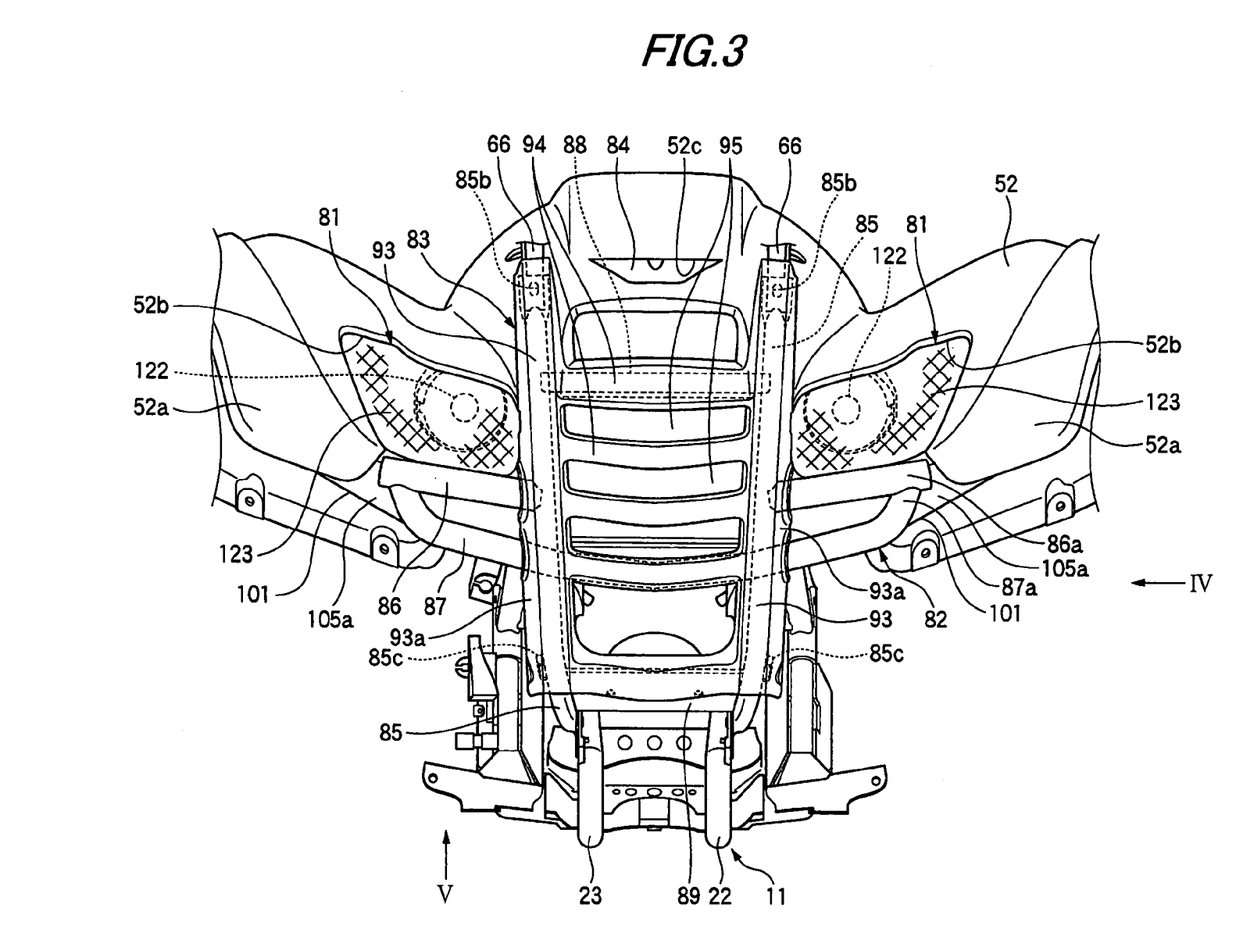
FIG. 3 is a front view along arrow III of FIG. 1, in which front wheels, a front final assembly and the like have been eliminated.
Figure 4:
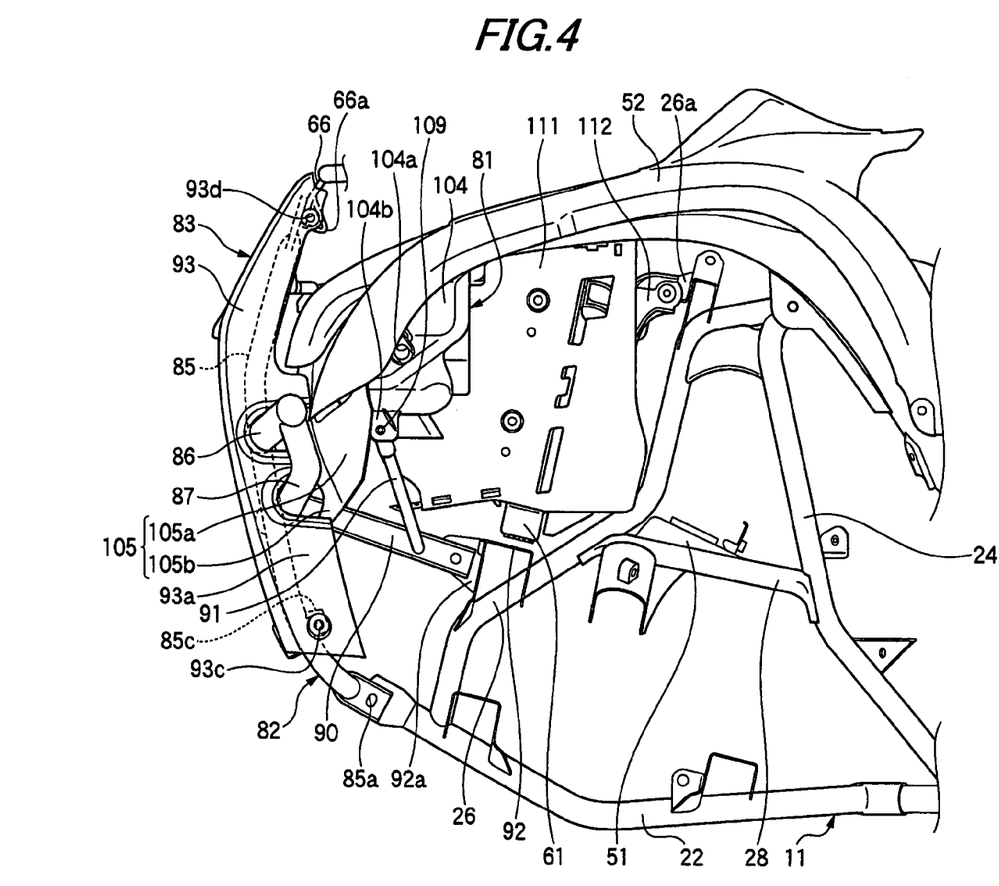
FIG. 4 is a side view taken along arrow IV of FIG. 3.
Figure 5:
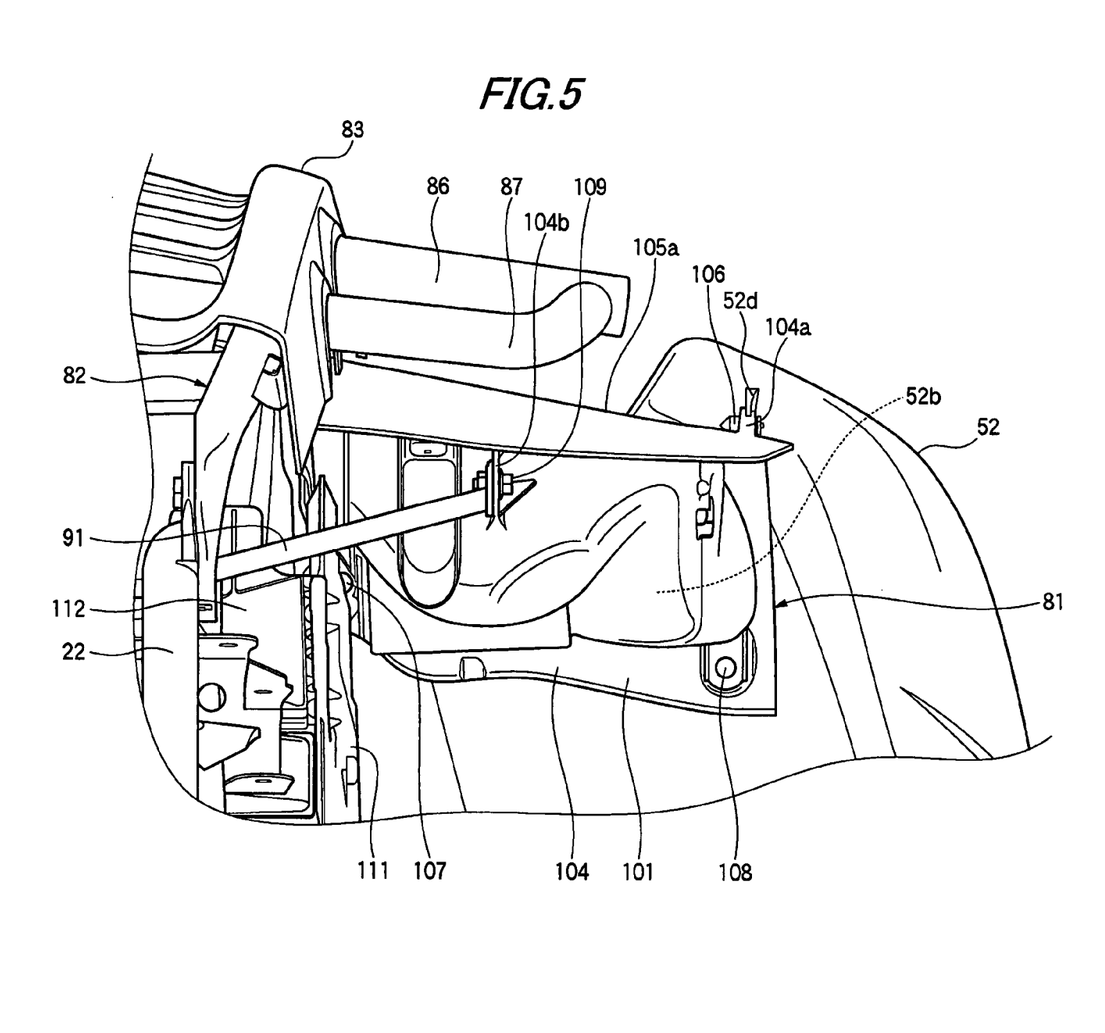
FIG. 5 is a bottom view along arrow V of FIG. 3.
Figure 6:
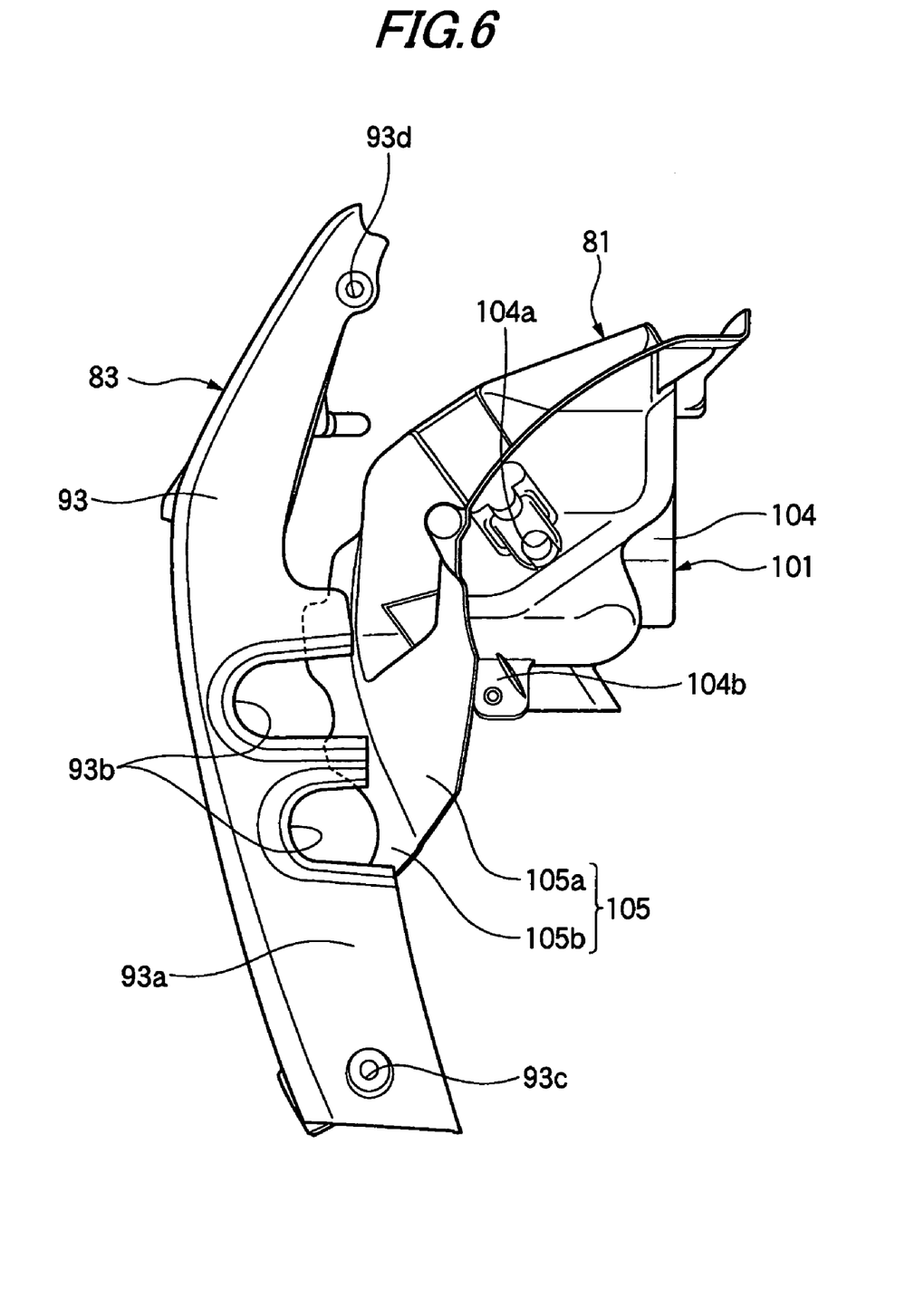
FIG. 6 is an enlarged view of an essential part, showing the positional relationship between a cover member of a light unit and a grille.
Figure 7:
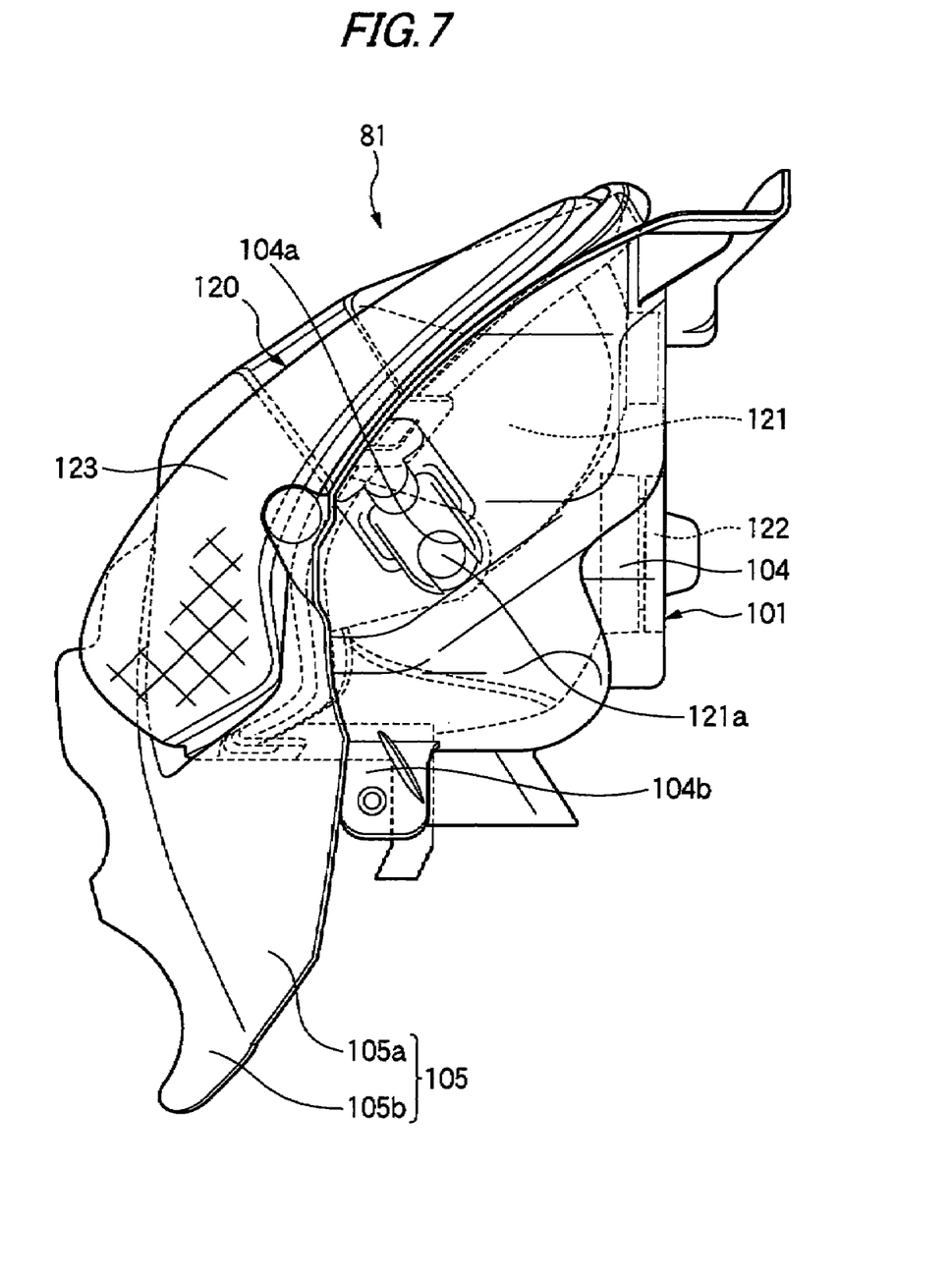
FIG. 7 is a side view of the light unit.
Figure 8A:
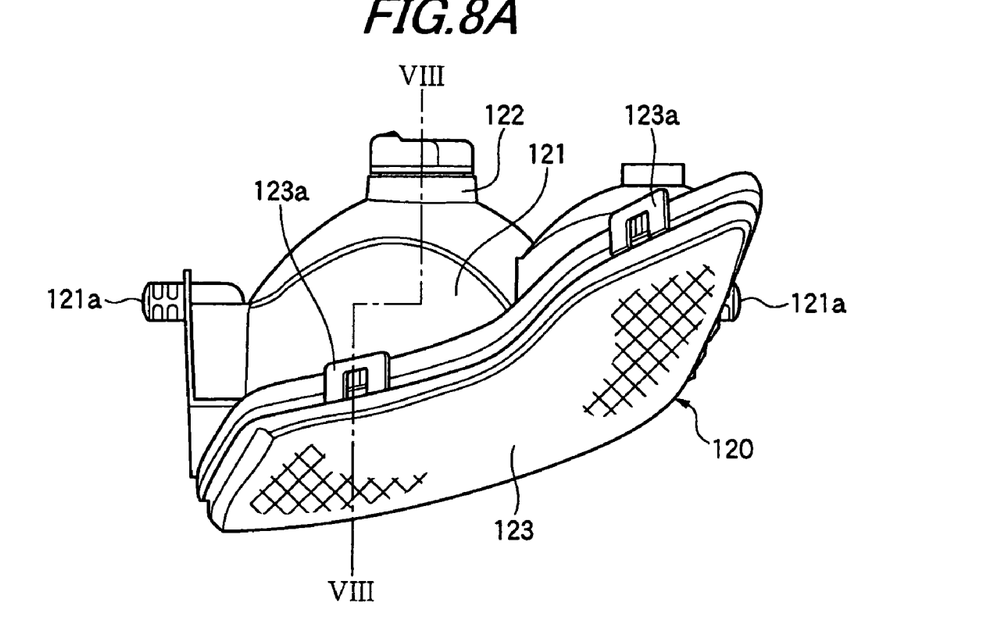
FIG. 8A is a top plan view of a lamp body portion of the light unit.
Figure 8B:
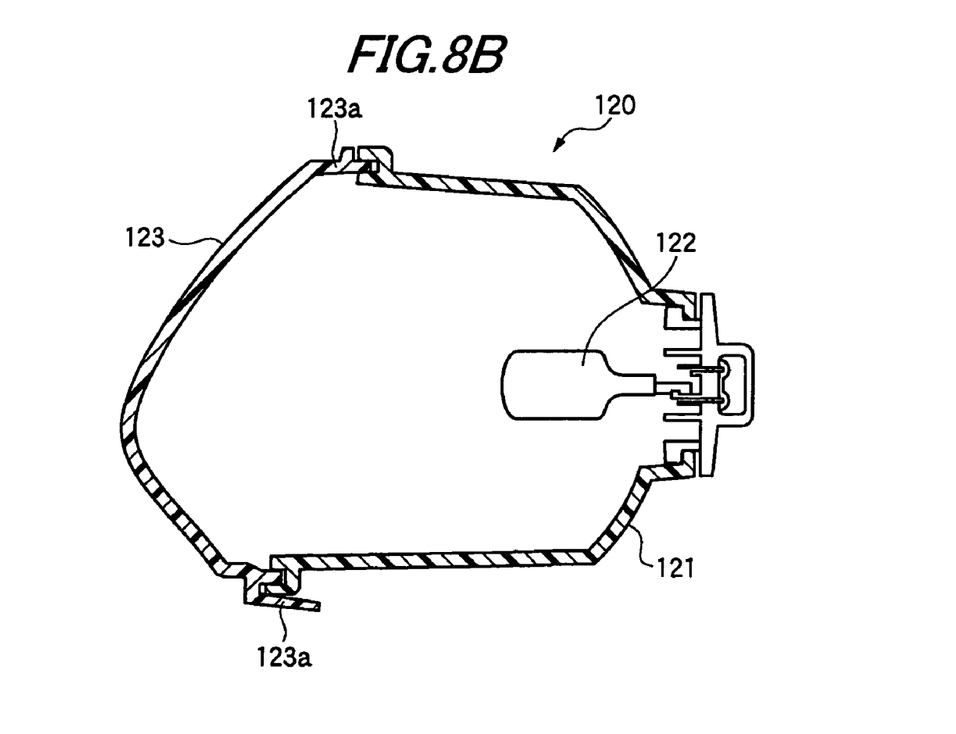
FIG. 8B is a sectional view along line VIII-VIII of FIG. 8A.

Now, the front structure for a vehicle according to the exemplary embodiment of the present invention will be described in detail below, based on FIGS. 3 to 8B. FIG. 3 is a front view along arrow III of FIG. 1, in which the front wheels, the front final assembly and the like are eliminated for easy understanding; FIG. 4 is a side view along arrow IV of FIG. 3; FIG. 5 is a bottom view along arrow V of FIG. 3; FIG. 6 is an enlarged view of an essential part showing the positional relationship between a cover member of a light unit and a grille; FIG. 7 is a side view of the light unit; FIG. 8A is a top plan view of a lamp body portion of the light unit; and FIG. 8B is a sectional view taken along line VIII-VIII of FIG. 8A.

The front cover 52 is a synthetic resin-made cover for covering a front portion of the vehicle body, and is integrally formed with fender portions 52a for covering the upper and rear sides of the front wheels 42, 43. A left-right pair of mounting portions 52b are formed on the front side of the front cover 52 so that the light units 81 are front on the front side. In addition, the upper surface of the front cover 52 is provided at its center with a roughly inverted trapezoid maintenance opening portion 52c, which is covered with a lid 84 and which ensures easy maintenance such as feeding of water into the radiator 61. Incidentally, the fender portions 52a may be formed as bodies separate from the front cover 52 so that they can be replaced.

The carry pipe 82 is a member formed by welding metallic pipes, and comprises a pair of vertical-direction extension portions extended in the vertical direction, and a pair of left-right direction extension portions 86, 87 welded substantially at the center of the vertical-direction extension portions 85 and extended in the left-right direction. Besides, connecting members 88, 89 are firmly attached to upper and lower portions of the pair of vertical-direction extension portions 85.

As shown in FIGS. 3 and 4, the vertical-direction extension portions 85 are provided with bolt holes 85a, 85b at the lower end upper ends thereof, and a mounting boss 85c is disposed slightly on the upper side of each bolt hole 85a. In addition, the left-right direction extension portions 86 disposed on the upper side are extended toward the outer sides in the vehicle width direction from the vertical-direction extension portions 85, whereas the left-right direction extension portion 87 disposed on the lower side is composed of a single member extending over the range between the pair of vertical-direction extension portions 85. Further, tip end portions 87a of the left-right extension portion 87 are bent upwards and connected to tip end portions 86a of the left-right extension portions 86.

Furthermore, a pair of first stays 90 extending skewly to the rear lower side are firmly attached to the left-right direction extension portion 87, and a pair of second stays 91 extending skewly to the front upper side are provided on the rear side of the first stays 90 (see FIG. 4).

Lower end portions of the pair of vertical-direction extension portions 85 are fastened respectively to front end portions of the lower frames 22 and 23 by bolts (not shown) passed through the bolt holes 85a. Rear end portions of the pair of first stays 90 are fastened to a flange portion 92a of the cross member 92 connecting intermediate portions of the front frames 26, 27 to each other, by bolts (not shown). As a result, the carry pipe 82 is firmly fixed to the vehicle body frame 11. In addition, upper end portions of the pair of vertical-direction extension portions 85 of the carry pipe 82 are fixed to front end portions of the front carrier 66 by bolts (not shown) passed through the bolt holes 85b.

The grille 83 is a synthetic resin-made member disposed on the front side of the carry pipe 82, and is integrally molded having a pair of cover portions 93 extending vertically and roughly in parallel to each other, and a plurality of connecting portions 94 (five connecting portions, in this embodiment) extending in the vehicle width direction so as to connect the pair of cover portions 93. The cover portions 93 are formed to be roughly U-shaped in section so as to surround the vertical-direction extension portions 85. The plurality of connecting portions 94 are provided at such positions as to generally cover an intermediate portion of the left-right direction extension portion 87 of the carry pipe 82 and the connecting members 88, 89, as viewed from the front side. This ensures that both end portions of the left-right direction extension portions 86 and the left-right direction extension portion 87 of the carry pipe 82 are exposed from the grille 83. In addition, the grille 83 defines a plurality of air intake window portions 95 by the cover portions 93 and the connecting portions 94.

Walls on the outer sides in the left-right direction of the cover portions 93 are provided with flange portions 93a extended from a roughly central portion in the vertical direction to the lower end and further rearwards (see FIG. 6). The flange portion 93a of the cover portion 93 is provided with roughly U-shaped grooves 93b at two positions in an intermediate portion thereof, and the cover member 93 is provided with mounting holes 93c and 93d in upper end lower portions thereof. The grille 83 has a configuration in which the vertical-direction extension portions 85 of the carry pipe 82 are let into the cover portions 93, the left-right direction extension portions 86 and 87 of the carry pipe 82 are put into the U-shaped grooves 93b, bolts (not shown) passed through the mounting holes 93c are put into screw engagement with the mounting bosses 85c of the carry pipe 82, and resin clips (not shown) are passed through the mounting holes 93d along the vehicle width direction and are fixed to brackets 66a, roughly triangular in side view, which are formed at front end portions of the front carrier 66 (see FIG. 4).

As shown in FIG. 7, each of the left-right pair of light units 81 has a cover member 101 attached to the front cover 52, and a lamp body portion 120 swingably mounted onto the cover member 101 so as to enable aiming.

As shown in FIGS. 8A and 8B, the lamp body portion 120 comprises a lamp body portion main body 121 having a pair of pivotal shafts 121a extended sideways in the vehicle width direction, a bulb 122 attached to the lamp body portion main body 121 through a socket portion, and a lens portion 123 which is engaged and fixed to the lamp body portion main body 121 through a plurality of engaging portions 123a formed at a peripheral edge portion thereof and which covers the front side of the bulb 122.

In addition, as shown in FIGS. 6 and 7, the cover member 101 comprises: a cover main body portion 104 having a pair of mounting holes 104a, through which the pair of pivotal shafts 121a of the lamp body portion main body 121 are passed, and disposing the lamp body portion 120 so as to enable aiming; and an extension wall portion 105 extending from the cover main body portion 105, and having a lower extension wall portion 105a extending along the left-right direction extension portions 86, 87 of the carry pipe 82, and a front extension wall portion 105b extending forwards substantially perpendicularly to the lower extension wall portion 105a.

As shown in FIG. 5, the cover member 101 is mounted in such a manner that a flange portion 104a formed on the front side of the cover main body portion 104 and a flange portion 52d formed on the back surface of the front cover 52 are fixed by a resin pin 106, and two mounting portions formed on the rear side of the cover main body portion 104 are fastened to the front cover 52 by tapping screws 107, 108. Further, the second stay 91 of the carry pipe 82 is fastened by a bolt 109 to a mounting boss 104b provided on the lower side of the cover main body portion 104.

In the light unit 81 thus supported on the front cover 52 and the carry pipe 82, the front extension wall portion 105b is inserted to the inside of the flange portion 93a of the grille 83 (see FIG. 6). Specifically, the front extension wall portion 105b and the flange portion 93a overlap with each other, whereby the gap between the grille 83 and the light unit 81 on the vehicle body side is eliminated, and the left-right direction extension portions 86 and 87 of the carry pipe 82 disposed therebetween are surrounded.

In addition, as shown in FIG. 4, shrouds 111 extending in the front-rear direction are disposed on both lateral sides of the radiator 61 disposed on the rear side of the grille 83. The radiator 61 is supported by a radiator support portion 112 fixed to the stays 26a, 27a (only the stay 26a on the viewer's side is shown) provided at upper portions of the front frames 26, 27, and by the cross member 92 between the front frames 26, 27. The shroud 111 are provided on the lateral sides of the radiator 61 and the radiator support portion 112 so as to extend in the vehicle body front-rear direction.

The shroud 111 is located on the rear side of the lap area where the flange portion 93a of the grille 83 and the front extension wall portion 105b of the light unit 81 overlap with each other. This ensures that the outside air taken in through the air intake window portions 95 of the grille 83 is efficiently guided by the shrouds 111 and taken into the radiator 61.

As has been described above, according to the front structure for a vehicle according to the exemplary embodiment, the vehicle body frame 11, the front cover 52 covering the front portion of the vehicle body frame 11, the left-right pair of light units 81 supported on the front cover 52, the carry pipe 82 having the vertical-direction extension portions 85 and the left-right direction extension portions 86 and 87 extending respectively in the vertical direction and in the left-right direction, and the grille 83 disposed on the front side of the carry pipe 82, are provided, the grille 83 covers the vertical-direction extension portions 85 of the carry pipe 82 from the front side while exposing at least a part of the left-right direction extension portions 86 and 87, and the front extension wall portions 105b of the cover members 101 of the light units 81 are disposed to overlap with the flange portions 93a of the grille 83. Therefore, the front structure for a vehicle has a good appearance quality, and the gap between the grille 83 and the vehicle body side can be eliminated, whereby it is made difficult for mud, water and the like due to splashes during running to enter into the vehicle body side. Furthermore, since the left-right direction extension portions 86 and 87 of the carry pipe 82 are not covered with other members, the carry pipe 82 can be easily gripped, which promises excellent operability.

In addition, the radiator 61 disposed on the rear side of the grille 83 and the shroud 111 extending in the front-rear direction on the lateral sides of the radiator 61 are further provided, and the lap areas where the flanges 93a of the grille 83 and the front extension wall portions 105b of the cover members 101 of the light units 81 overlap with each other are located on the front side of the shroud 111. Therefore, the grille 83 and the front extension wall portions 105b of the cover members 101 of the light units 81 cooperate to define ducts. This ensures that the outside air is efficiently guided to the shrouds 111, and is taken in easily. Further, it is difficult for mud, water and the like to enter to the vehicle body side during running.

Furthermore, the grille 83 has the flange portions 93a so formed as to surround the left-right direction extension portions 86 and 87 of the carry pipe 82, and the flange portions 93a overlap with the front extension wall portions 105b of the cover members 101 of the light units 81. Therefore, the gap between the grille 83 and the vehicle body side can be eliminated, it is made difficult for mud, water and the like to enter, and appearance quality is enhanced.

Besides, the lower extension wall portions 105a of the cover members 101 of the light units 81 extend along the left-right direction extension portions 86 and 87 of the carry pipe 82. Therefore, the rear side of the left-right direction extension portions 86 and 87 of the carry pipe 82 can be covered. This ensures that mud and water due to mud splashes are received by the lower extension wall portions 105a, and are thereby prevented from easily entering to the vehicle body side, and appearance quality can be enhanced.

Furthermore, the carry pipe 82 has a plurality of left-right direction extension portions 86 and 87 in the left-right direction, and the tip end portions 86a and 87a of at least a pair of left-right direction extension portions 86 and 87 are connected to each other. This ensures that easily grippable portions of the carry pipe 82 can be gripped according to the situation, and operability is thereby enhanced largely.

Incidentally, the present invention is not limited to the above-described exemplary embodiment, it will be apparent to those skilled in the art that various modifications and variations can be made to the exemplary embodiment. In the exemplary embodiment, a configuration is adopted in which the front extension wall portion 105b of the light unit 81 overlaps with the flange portion 93a formed in the grille 83, whereby the gap between the grille 83 and the vehicle body side is eliminated. However, a configuration may be adopted in which the grille 83 is not provided with the flange portions 93a, the front extension wall portions 105b of the light units 81 are so formed as to surround the left-right direction extension portions 86 and 87 of the carry pipe 82, and they enter into the inside of the cover portion 93 of the grille 83.

In addition, while the carry pipe 82 is provided with a pair of left-right direction extension portions in the left-right direction in this embodiment, one each left-right direction extension portion may be provided, or three or more left-right direction extension portions may be provided.

What is claimed is:

1. A front structure for a vehicle comprising:
   a vehicle body frame;
     a front cover covering a front portion of the vehicle body frame;
     a left-right pair of light units supported on the front cover;
     a carry pipe supported on a front end of the vehicle body frame and including a vertical-direction extension portion extending in a vertical direction and a left-right direction extension portion extending in a left-right direction; and
   a grille disposed on a front side of the carry pipe,
     wherein the grille covers the vertical-direction extension portions from the front side, while exposing at least a part of the left-right direction extension portions, and each of the light units includes an extension wall portion overlapping with the grille.

2. The front structure according to claim 1, further comprising:
   a radiator disposed on a rear side of the grille; and
   a shroud extending in the front-rear direction on lateral sides of the radiator,
   wherein areas where the grille and the extension wall portions of the light units overlap are located on a front side of the shroud.

3. The front structure according to claim 1, wherein the grille includes a flange portion that surrounds the left-right direction extension portions, and
   the flange portion overlaps with the extension wall portions of the light units.

4. The front structure according to claim 1, wherein the extension wall portions of the light units extend along the left-right direction extension portions.

5. The front structure according to claim 1, wherein the left-right direction extension portion includes a plurality of left-right direction extension members, and two of said left-right direction extension members are connected to each other at tip end portions of said two of said left-right direction extension members.

* * * * *